United States Patent
Jung

(10) Patent No.: US 10,836,324 B2
(45) Date of Patent: Nov. 17, 2020

(54) FLEXIBLE DISPLAY FRAMEWORK FOR CARS

(71) Applicant: Panasonic Automotive Systems Company of America, Division of Panasonic Corporation of North America, Peachtree City, GA (US)

(72) Inventor: Jin Woo Jung, Johns Creek, GA (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 16 days.

(21) Appl. No.: 16/409,937

(22) Filed: May 13, 2019

(65) Prior Publication Data

US 2019/0263328 A1    Aug. 29, 2019

Related U.S. Application Data

(63) Continuation of application No. 15/418,139, filed on Jan. 27, 2017, now Pat. No. 10,328,865.

(60) Provisional application No. 62/287,651, filed on Jan. 27, 2016.

(51) Int. Cl.
| | | |
|---|---|---|
| *B60R 11/02* | (2006.01) | |
| *G09F 21/04* | (2006.01) | |
| *B60K 35/00* | (2006.01) | |
| *G09F 9/30* | (2006.01) | |
| *G09G 3/00* | (2006.01) | |
| *B60K 37/04* | (2006.01) | |
| *B60R 11/00* | (2006.01) | |

(52) U.S. Cl.
CPC .......... *B60R 11/0235* (2013.01); *B60K 35/00* (2013.01); *B60K 37/04* (2013.01); *G09F 9/301* (2013.01); *G09F 21/04* (2013.01); *G09G 3/00* (2013.01); *B60K 2370/1529* (2019.05); *B60K 2370/67* (2019.05); *B60K 2370/771* (2019.05); *B60K 2700/00* (2013.01); *B60R 2011/0021* (2013.01); *B60R 2011/0028* (2013.01); *B60R 2011/0082* (2013.01); *B60R 2011/0084* (2013.01); *B60R 2011/0092* (2013.01); *G09G 2380/02* (2013.01); *G09G 2380/10* (2013.01)

(58) Field of Classification Search
CPC ......... B60R 11/0235; B60R 2011/0021; B60R 2011/0082; B60R 2011/0084; B60R 2011/0092; B60R 2011/0028; B60K 37/04; B60K 35/00; B60K 2700/00; B60K 2370/1529; B60K 2370/67; B60K 2370/771; G09G 3/00; G09G 2380/02; G09G 2380/10; G09F 9/301; G09F 21/04
USPC ....................................................... 296/37.7
See application file for complete search history.

(56) References Cited

U.S. PATENT DOCUMENTS

2017/0349098 A1*  12/2017  Uhm ..................... B60K 35/00

* cited by examiner

*Primary Examiner* — Pinel E Romain
(74) *Attorney, Agent, or Firm* — Laurence S. Roach, Esq.

(57) ABSTRACT

A motor vehicle includes a window and a body having a storage space with an opening facing toward the window. A flexible electronic display is movable from a first position overlying the window and a second position within the storage space. The window may be a windshield, and the storage space may be within a roof of the vehicle.

20 Claims, 3 Drawing Sheets

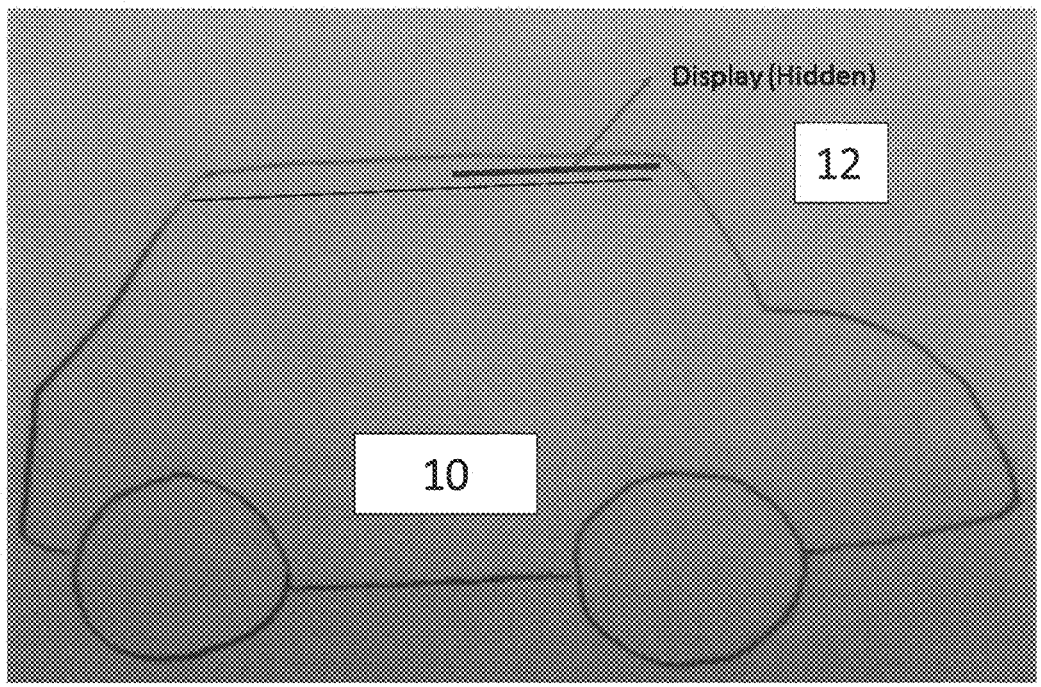
FIG. 1A Example: Flexible display hidden inside of the car roof.
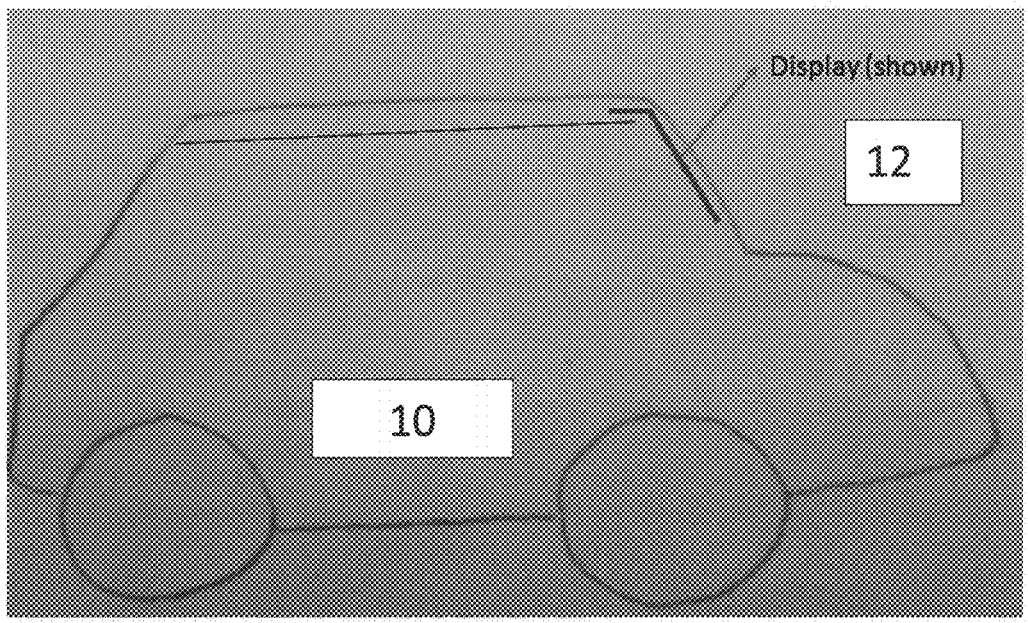
FIG. 1B Example: Flexible display shown.

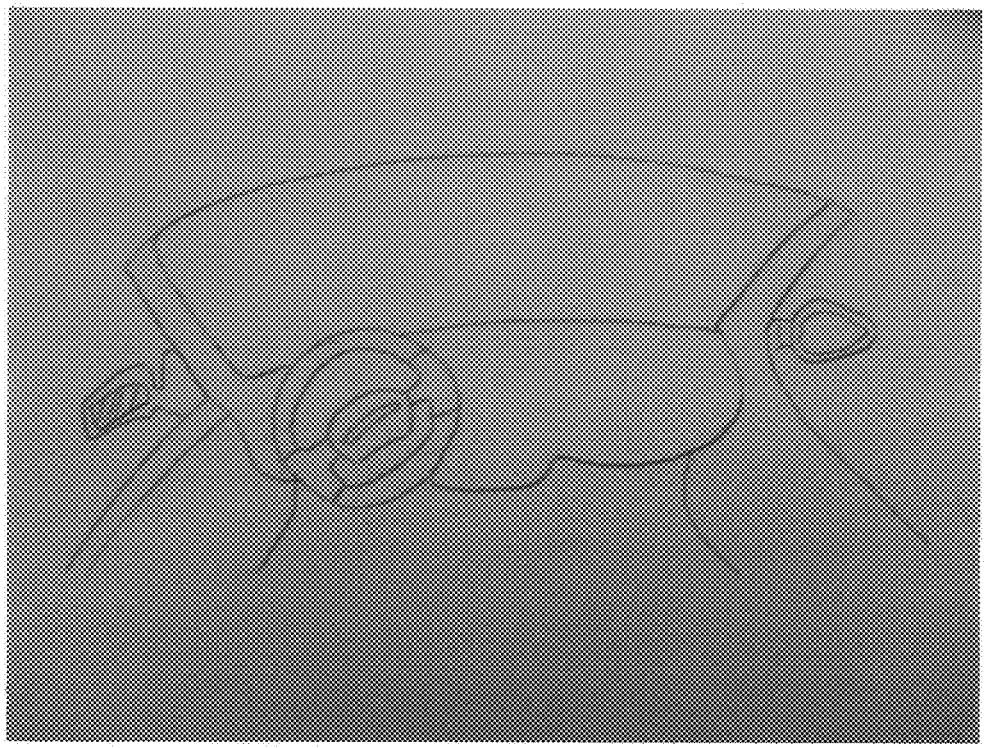
FIG. 2A Example: Flexible display hidden inside of the car roof (inside view).
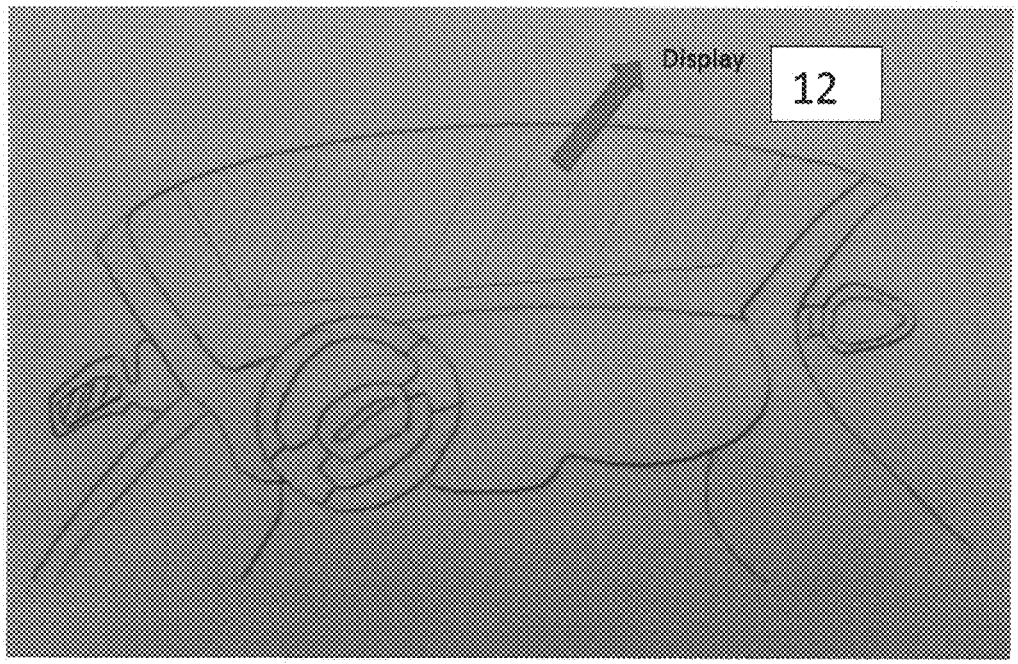
FIG. 2B Example: Flexible display shown (inside view).

FLEXIBLE DISPLAY FRAMEWORK FOR CARS

CROSS-REFERENCED TO RELATED APPLICATIONS

This application is a continuation of U.S. patent application Ser. No. 15/418,139, filed on Jan. 27, 2017, which is currently under allowance, which claims benefit of U.S. Provisional Application No. 62/287,651, filed on Jan. 27, 2016, which the disclosure of which are hereby incorporated by reference in their entirety for all purposes.

FIELD OF THE INVENTION

The disclosure relates to the field of display screens, and, more particularly, to display screens mounted in motor vehicles.

BACKGROUND OF THE INVENTION

In recent years, there have been a lot of work and improvements in the area of flexible display technologies, and the interest on this technology is still growing.

SUMMARY

The present invention may provide a simple way to apply flexible display technology inside of a vehicle to improve the user experience. According to the invention, the flexible display may be hidden (e.g., non-visible) until the user needs it. When needed, the flexible display may appear in car windows.

In one embodiment, the invention comprises a motor vehicle including a window and a body having a storage space with an opening facing toward the window. A flexible electronic display is movable between a first position overlying the window and a second position within the storage space.

In another embodiment, the invention comprises a motor vehicle including a windshield and a roof having a storage space with an opening facing in a forward direction. A flexible electronic display is movable between a first position overlying the windshield and a second position within the storage space.

In yet another embodiment, the invention comprises a motor vehicle including a rear door having a body disposed below a window. The door body has a storage space with an upward facing opening. A flexible electronic display is movable between a first position overlying the window and a second position within the storage space. An electronic processor is communicatively coupled to the flexible electronic display and transmits a video signal to be presented on the flexible electronic display.

An advantage of the present invention is that it may provide flexibility in operating a vehicle in a nonintrusive fashion.

Another advantage is that it provides a user with an option to hide or show the flexible display based on his preference at the moment.

Yet another advantage is that the flexible display can be better protected from damage during an accident when the display is in its hidden position.

BRIEF DESCRIPTION OF THE DRAWINGS

A better understanding of the present invention will be had upon reference to the following description in conjunction with the accompanying drawings.

FIG. 1A is a side cross-sectional view of one embodiment of a vehicle of the present invention in which a flexible display is in a position hidden inside of the car roof.

FIG. 1B is a side cross-sectional view of the vehicle of FIG. 1A in which the flexible display is in another position visible on the windshield.

FIG. 2A is a forward looking perspective view inside of the vehicle of FIG. 1A with the flexible display in the first position of FIG. 1A.

FIG. 2B is a forward looking perspective view inside of vehicle 10 with the flexible display in the second position of FIG. 1B.

DETAILED DESCRIPTION OF THE PREFERRED EMBODIMENTS

Figure 3:
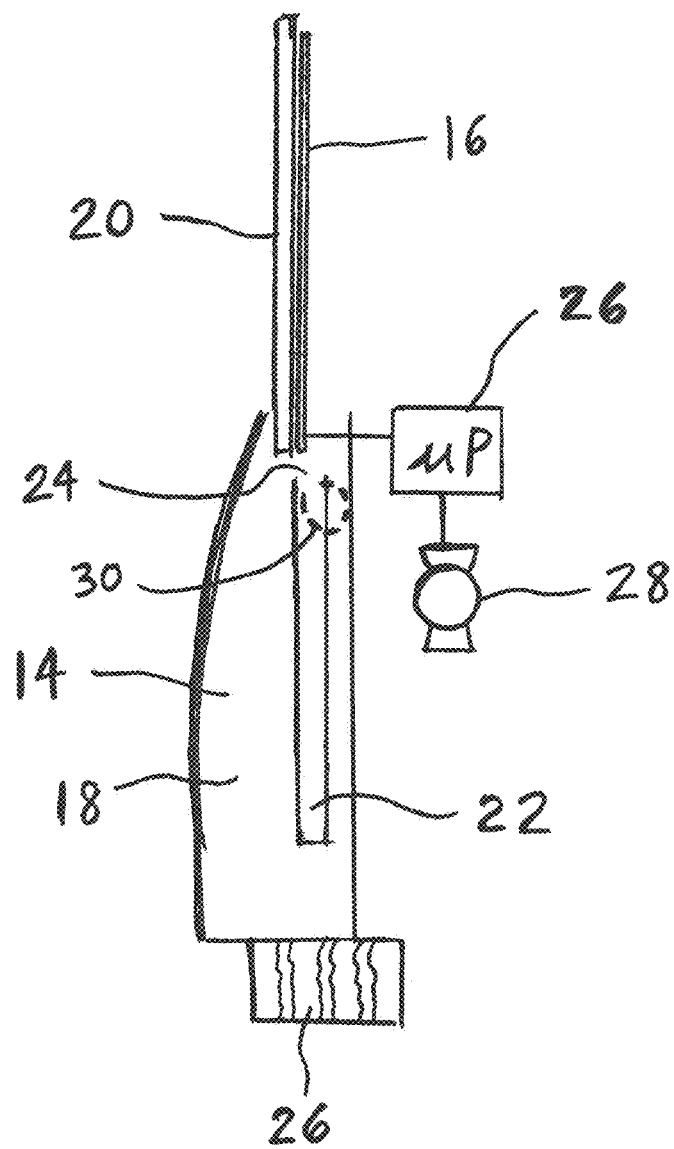
FIG. 3 is a rear sectional view of a motor vehicle rear door of the present invention including a flexible display.

FIG. 1A illustrates one embodiment of a vehicle 10 of the present invention in which a flexible display 12 is hidden inside of the car roof. Flexible display 12 may display images from a processor (not shown), just as does a conventional display screen or monitor. When needed, flexible display 12 can appear in the windshield as shown in FIG. 1B. The inside view of this particular example is also shown in FIGS. 2A-B. FIG. 2A is a forward looking view inside of the vehicle of FIG. 1A with the flexible display hidden inside of the car roof, as in FIG. 1A. FIG. 2B is a forward looking view inside of the vehicle of FIG. 1A with the flexible display aligned with the windshield, as in FIG. 1B.

Because display 12 is flexible, it can be bent to fit any curved, non-flat and/or uneven area. The applications and capabilities of the flexible display can be many, from providing a tinting effect to providing augmented reality, such as a head-up display (HUD). Thus, the invention may provide a better user experience once the flexible display is activated.

An advantage of some embodiments of the hidden/visible framework for a flexible display of the invention is that the display is nonintrusive. Because the display is hidden, everything on the vehicle looks the same when the invention is present but the display is not activated as it does when the invention is not present. Thus, users who are not comfortable with the invention do not have to see the display when it is not activated. For example, if the inventive display tints the car window, some user may not like the tinting. However, with the inventive flexible display framework configured for tinting effect, a user has the option to disable and enable tinting.

Another advantage of some embodiments of the hidden/visible framework for a flexible display of the invention is that the display is protected against damage. Usually, a windshield, windows or any fixed display device inside of a car can get easily damaged when an accident happens. However, because the inventive display may be disposed somewhere relatively safe (e.g., inside of the roof) when not being used, the display may be less prone to damages from a car accident.

Although the above-described embodiment includes the display appearing in the windshield or front window, the scope of the invention is not limited to any certain window in which to present the display. For example, the display can be employed in a rear seat side window for passenger entertainment or information.

In terms of protecting the display from damage, one of the best locations for hiding the display is in the roof. However, the scope of the invention is not limited to any particular location for hiding the display or to how the display is hidden. In the example of a flexible display on a side window, the display can be hidden inside a vehicle door. The flexible display in a hidden state can be flat (as shown in FIG. 1A), bent, or rolled up in the case where a flat storage space is not available, depending upon the characteristics of the vehicle and the flexible display.

In one embodiment, the flexible display may be manually moved between the stored position and the shown or operating position. In another embodiment, the flexible display may be moved by a motor between the stored position and the shown or operating position. The motor may be activated automatically in response to the display being turned ON, or a user-operable switch may be provided so that the user can cause the motor to move the display from one position to the other position.

FIG. 3 illustrates a rear sectional view of a motor vehicle rear door 14 of the present invention including a flexible display 16. Rear door 14 includes a body 18 disposed below a window 20. Door body 18 includes a storage space 22 with an upward facing opening 24. Door body 18 is disposed generally above tire 26. Flexible electronic display 16 is movable between a first position overlying window 20, as shown in FIG. 3, and a second position in which display 16 is disposed within storage space 22. Flexible electronic display 16 may be manually movable, such as with a hand crank, between the position shown in FIG. 3 in which display 16 overlies window 20, and the position in which display 16 is disposed within storage space 22. Alternatively, a motor 28 may be used to move display 16 between the position shown in FIG. 3 in which display 16 overlies window 20, and the position in which display 16 is disposed within storage space 22.

An electronic processor 26 is communicatively coupled to flexible electronic display 16 and transmits a video signal to be presented on flexible electronic display 16. In one embodiment, flexible electronic display 16 provides a tint or shading to window 20.

In FIG. 3, storage space 22 is shown as being substantially planar, and flexible electronic display 16 may be substantially planar when disposed in storage space 22. However, in another embodiment, a storage space 30 is substantially cylindrical, and flexible electronic display 16 is rolled up in a substantially cylindrical shape when disposed in storage space 30.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A motor vehicle, comprising:
a door including a body disposed below a window, the door body having a storage space;
a flexible electronic display movable between a first position overlying the window and a second position within the storage space; and
an electronic processor communicatively coupled to the flexible electronic display and configured to transmit a video signal to be presented on the flexible electronic display.

2. The motor vehicle of claim 1 wherein the flexible electronic display provides a tint or shading to the window.

3. The motor vehicle of claim 1 wherein the flexible electronic display is manually movable between the first position and the second position.

4. The motor vehicle of claim 1 further comprising a motor configured to move the flexible electronic display between the first position and the second position.

5. The motor vehicle of claim 1 wherein the storage space is substantially planar, and the flexible electronic display is substantially planar when disposed in the storage space.

6. The motor vehicle of claim 1 wherein the storage space is substantially cylindrical, and the flexible electronic display is rolled up in a substantially cylindrical shape when disposed in the storage space.

7. The motor vehicle of claim 1 wherein the storage space is substantially cylindrical.

8. The motor vehicle of claim 1 wherein the flexible electronic display is rolled up in a substantially cylindrical shape when disposed in the storage space.

9. A motor vehicle, comprising:
a window;
a body having a storage space with an opening facing toward the window; and
a flexible electronic display movable between a first position overlying the window and a second position within the storage space, the flexible electronic display being rolled up when disposed in the storage space.

10. The motor vehicle of claim 9 wherein the window comprises a windshield, and the storage space is within a roof of the vehicle.

11. The motor vehicle of claim 9 wherein the flexible electronic display is manually movable between the first position and the second position.

12. The motor vehicle of claim 9 further comprising a motor configured to move the flexible electronic display between the first position and the second position.

13. The motor vehicle of claim 9 further comprising an electronic processor communicatively coupled to the flexible electronic display and configured to transmit a video signal to be presented on the flexible electronic display.

14. The motor vehicle of claim 9 wherein the storage space is substantially cylindrical.

15. A motor vehicle, comprising:
a windshield;
a roof having a storage space with an opening facing in a forward direction; and
a flexible electronic display movable between a first position overlying the windshield and a second position within the storage space, the flexible electronic display being rolled up when disposed in the storage space.

16. The motor vehicle of claim 15 wherein the flexible electronic display is manually movable between the first position and the second position.

17. The motor vehicle of claim 15 further comprising a motor configured to move the flexible electronic display between the first position and the second position.

18. The motor vehicle of claim 15 further comprising an electronic processor communicatively coupled to the flexible electronic display and configured to transmit a video signal to be presented on the flexible electronic display.

19. The motor vehicle of claim 15 wherein the storage space is substantially cylindrical.

20. The motor vehicle of claim 15 wherein the flexible electronic display is rolled up in a substantially cylindrical shape when disposed in the storage space.

* * * * *